United States Patent Office 3,324,731
Patented June 13, 1967

3,324,731
START-UP CONDITIONING MEANS FOR AN
AZIMUTH REFERENCE
William W. Burmeister, Byron R. Duckworth, and Richard K. Radtke, Phoenix, Ariz., assignors to Sperry Rand Corporation, Great Neck, N.Y., a corporation of Delaware
Filed Sept. 16, 1964, Ser. No. 396,888
6 Claims. (Cl. 74—5.4)

This invention relates to a system including an azimuth reference, a directional gyro having a vertical ring slaved to the reference, and start-up conditioning means operable to orient the components quickly with the rotor component of the gyro spinning at a determined speed. The azimuth reference of the improved system is preferably a flux valve of conventional structure whose electrical output depends on the orientation of the valve in the earth's magnetic field. The slave component of the system is a directional gyro with a gyroscopic rotor that is spun by an electric motor. In the improved orienting combination, the start-up conditioning means includes means for rendering slaving at a normal energy level, or normal slaving rate, ineffective and for rendering slaving at an energy level higher than the normal energy level, or greater slaving rate, effective. Changeover from the start-up condition to the normal operating condition reverses the operativeness of the slaving levels and depends on the rotation of the gyroscopic rotor at a determined speed as well as the orientation of the gyro ring and azimuth reference.

An object of the invention is to provide a system of the character described in which the changeover from start-up to normal operating condition is effected automatically when the gyroscopic rotor of the system is operational and the slaved components are oriented. The safety factor required for the completion of the noted operations in systems where the changeover depended on elapsed time from start-up is eliminated in the improved system so that the operational start-up time of the system is reduced considerably.

A further essential element of the slaving combination of the improved system includes an electric source for energizing the stator of the motor operating the gyroscopic rotor as well as the azimuth reference. The system further includes a circuit that connects the rotor motor to the source under start-up as well as normal operating conditions and a circuit in parallel to the motor circuit with the coil of a relay thereon. The provided changeover means includes circuits with the armatures of the motor relay included therein and respective second and third relays whose respective armatures are included in the motor circuit.

A further feature of the invention is provided by provision in the improved system of a monitoring circuit whose operational condition is dependent on the energization of the relay coil of the parallel motor circuit.

Figure 1A:
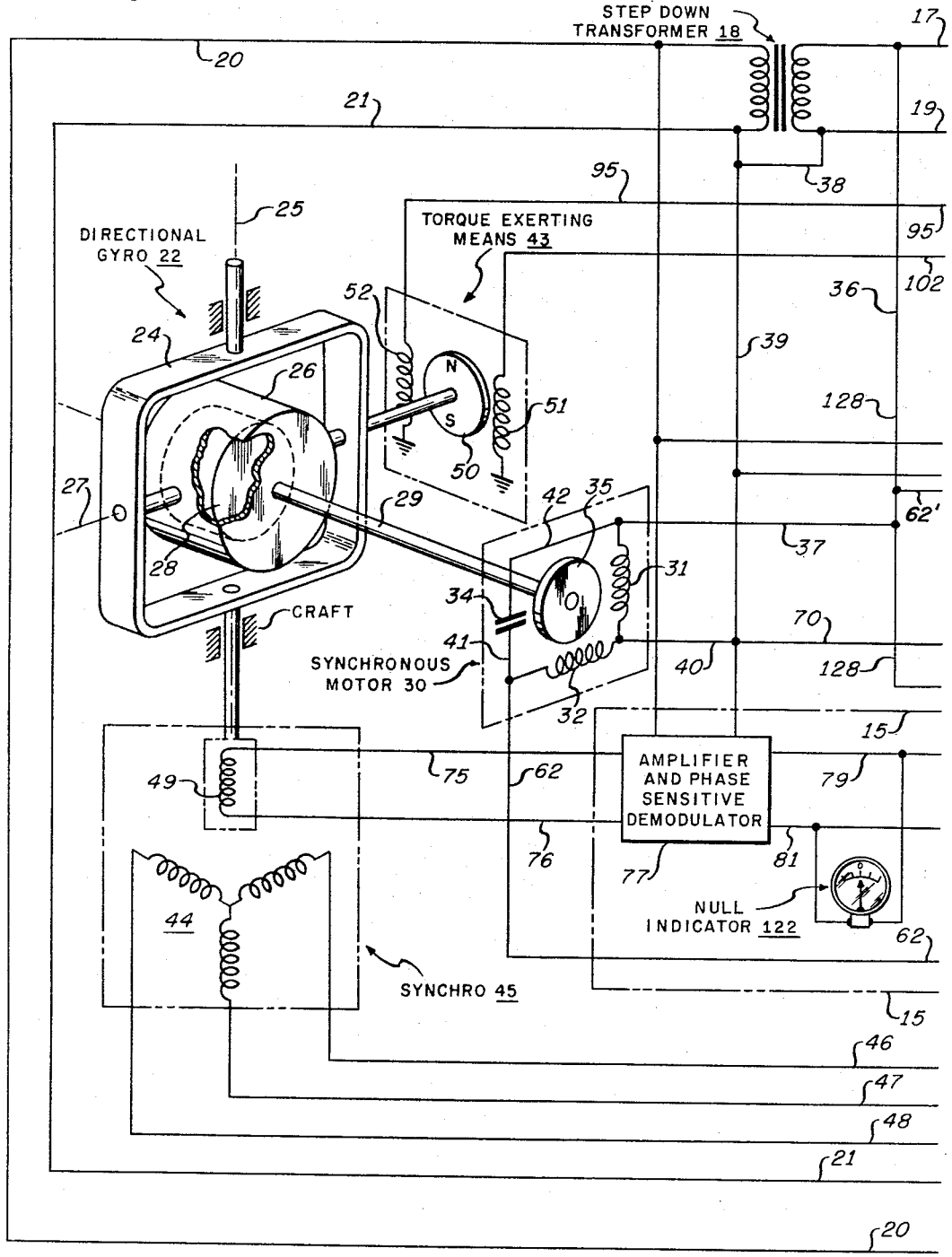
Figure 1B:
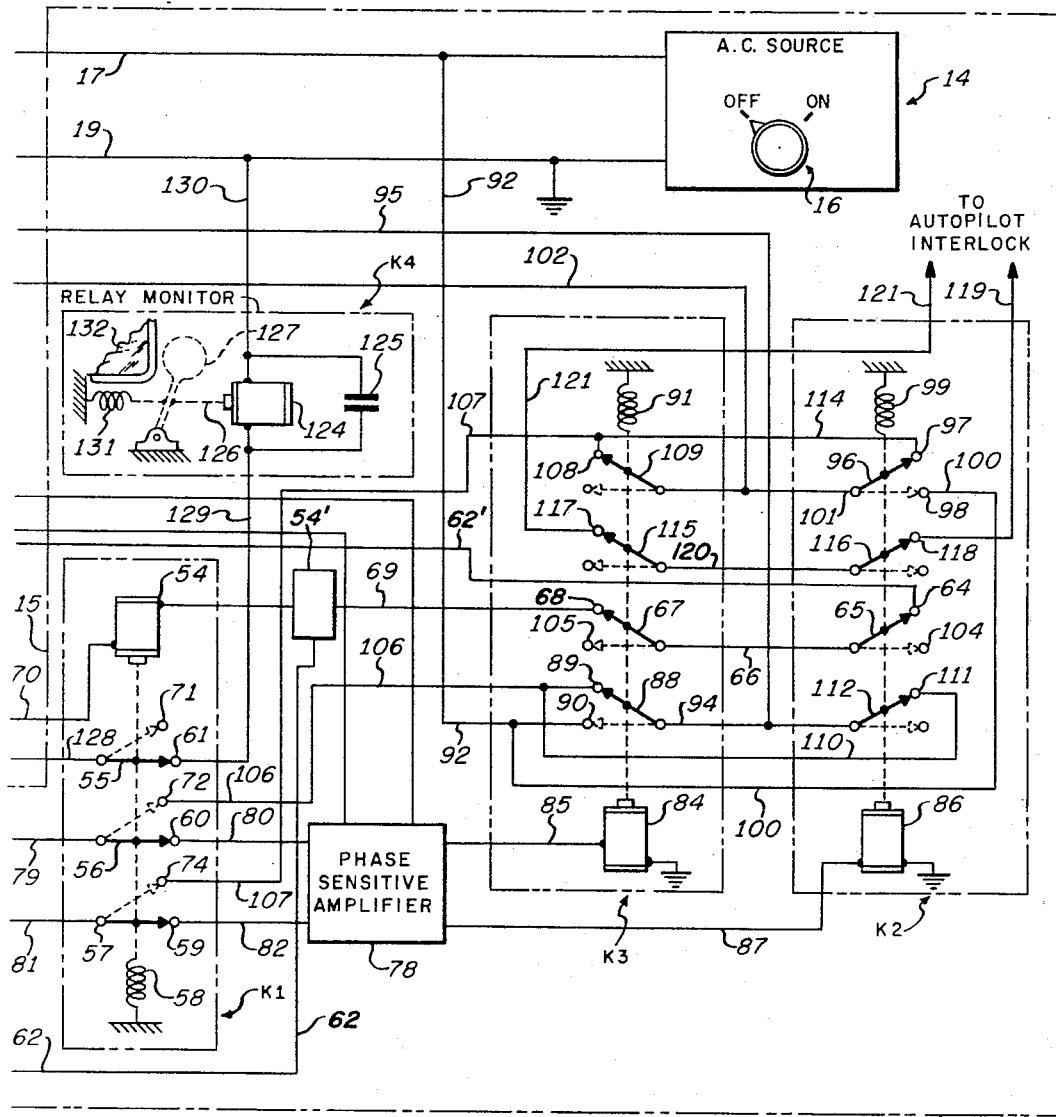
Figure 1B:
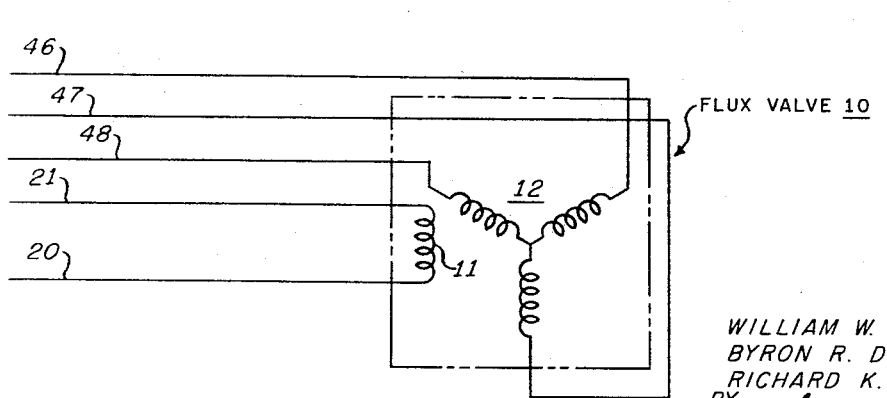

Further objects, features and structural details of the improved orienting system will become apparent from the following description of the subject invention in relation to the accompanying drawing which shows a schematic view in the respective FIGS. 1(a) and 1(b) of the individual components and wiring diagram of the connections therebetween.

As shown in FIG. 1(b), the azimuth reference included in the improved system is an earth's field response device or flux valve 10 of conventional structure. Valve component 10 is an assembly that includes an exciting winding 11 and a Y-connected output winding 12 that is fixedly mounted on a craft so that its orientation in the horizontal plane of the earth's field changes as the craft moves in azimuth to change its heading. The exciting winding 11 of the valve 10 is energized by a suitable A.C. source indicated at 14 on electrical chassis 15 by way of off-on switch 16, power lead 17 to the input winding of a stepdown transformer 18, FIG. 1(a), a ground lead 19 for the transformer, and leads 20 and 31 connecting the low voltage winding of the transformer to the winding 11. The legs of winding 12 change position in azimuth with respect to the horizontal lines of the earth's field as the craft using the system turns about its vertical axis with the flux valve producing an output that depends on the heading of the craft.

The directional gyro component of the improved system is indicated at 22 in FIG. 1(a). The conventional structure of component 22 includes a ring 24 mounted with freedom about a vertical axis 25 with respect to the craft. A rotor frame 26 is carried by the vertical ring 24 with freedom about a normally horizontal axis 27. A gyroscopic rotor 28 is carried by the frame 26 to spin about a normally horizontal axis 29 perpendicular to the axis of the frame.

An essential component of the improved system is provided by the rotor spinning means for the gyro element 22 shown in the drawing as an electric motor 30 of the synchronous type. Motor 30 operates over the start-up operational period to bring the gyroscopic rotor up to a normal operating speed and remains in operation thereafter while off-on switch 16 is in the on position. The motor shown in FIG. 1(a) includes a two-phase stator with windings 31 and 32 and a phasing capacitor 34 that are fixed to frame 26. The movable component of the motor is provided by a hysteresis rotor 35 that is suitably mounted to move with the gyroscopic rotor 28 about axis 29. To energize the motor 30 from source 14, the stator winding 31 is connected to power lead 17 by way of leads 36 and 37. Ground lead 19 is connected to the other end of the winding 31 through leads 38, 39 and 40. The phasing capacitor 34 is connected in the motor circuit in parallel with winding 31 and in series with winding 32. As shown in FIG. 1(a), one end of winding 32 is connected to the ground lead 40. The other end of the winding 32 is connected to one side of the capacitor 34 by lead 41. Lead 42 connects the other side of the capacitor 34 to the power lead 37. The start-up conditioning period is initiated when the switch 16 is turned on and the source 14 is connected to the stator of motor 30. As the speed of the rotor 35 increases the current drawn by the stator decreases with the rotating field of the stator locking with the field of the hysteresis rotor 35 at synchronous motor speed which in direct drive corresponds to the speed of rotation of the gyroscopic rotor 28.

In the improved system, the gyro component 22 is slaved to the azimuth reference component 10 through a torque exerting means 43 that is energized at an energy level higher than normal during the start-up operational period and is energized at a normal energy level subsequent to this period. The slaving means shown in the drawing further includes a data transmission means for operatively connecting the relatively distantly spaced components 10 and 22. The flux valve 10 is preferably located at a point on the craft relatively free of influences disturbing the earth's field. The directional gyro is preferably located at a point on the craft where it is least subject to disturbances due to motions of the craft. The data of valve 10 is transmitted in the structure shown in the drawing to corresponding Y-connected windings 44 of the stator of a synchro or transformer 45 by way of leads 46, 47 and 48. The rotor of synchro 45 is provided by a winding 49 that is fixedly connected to the trunnion of ring 24 of the directional gyro. The stator of synchro 45 moves with respect to synchro rotor as the craft turns about its vertical axis. The data transmission means coupling flux valve 10 and gyro 22 produce an electric output signal the sense and magnitude of which depends on the sense and magnitude of the angular displacement between component 22 and component 10 that is, a signal proportional to the synchronization error between flux valve 10 and gyro 22. For a given craft heading the voltages in the legs of the Y-connected stator winding 44 create a magnetic vector which varies in position across the stator 49 in the same relationship as the legs of the Y-connected valve winding 12 vary in their orientation to the direction of the flux lines of the earth's magnetic field. When rotor winding 49 is, for example, at right angles to this vector no voltage is induced therein and the output is null and the components are synchronized. The slaving of gyro 22 to flux valve 10 is accomplished through torque motor means 43 which exerts a greater than normal torque about axis 27 to precess the vertical ring 24 about its axis 25 in such a direction that the components are quickly synchronized under start-up conditions and maintains synchronization at a normal torquing energy level at a time subsequent to the start-up operation. Torque exerting means 43 is shown in FIG. 1(a) as a motor with a magnetized rotor 50 connected to the trunnion of the frame 26 and a stator fixed to the ring 24 having differential windings 51 and 52 to ground, one or the other of which is energized to restore the components to an oriented or synchronized relation.

The start-up conditioning means included in the improved system includes changeover means that connect synchro 45 to the torque exerting means over the start-up period so that the means 43 is energized at a higher than normal energy level. The changeover means includes a relay K1 whose coil 54 is in the output circuit of a threshold amplifier 54' having its input 62 connected to be responsive to the energizing circuit for the synchronous motor 30 connected to bring the gyroscopic rotor up to speed. Relay K1 also includes ganged armatures 55, 56 and 57 that are biased by spring 58 against contacts 59, 60 and 61 when the coil 54 is unenergized. In the operation of the system, coil 54 is energized when the gyroscopic rotor 28 reaches a determined speed below its normal operating or synchronous speed and the components are oriented at which time the relay K1 circuit of the system is closed. This circuit includes lead 62 to motor lead 41 and a power lead 62' for detector 54' connected to contact 64 which is engaged by the armature 65 of relay K2, lead 66 to an armature 67 of relay K3 engaged with contact 68, lead 69 to threshold detector 54' for coil 54 of relay K1, and lead 70 from the coil 54 to the ground lines 39 and 38.

The alternate contacts engaged by the armatures 55, 56 and 57 of relay K1 to change from start-up to a normal operational condition are indicated at 71, 72 and 74. In the full line position of the ganged armatures of relay K1 the system operates under start-up conditions as effective means operable depending on the output of the data transmission means for energizing the torquing means at an energy level higher than the normal energy level. Here, the circuit that operates torque motor 43 at the normal energy level is rendered ineffective by opening the armatures 56, 57 and contacts 72, 74 of relay K1. In the fast synchronization mode, the slaving error signal provided by rotor winding 49 of control transformer 45 is used to energize relays K2 or K3 rather than to energize torquer 43 directly. As shown in FIG. 1(a), the synchro winding 49 of the data transmission means is connected by leads 75, 76 to an amplifier and phase sensitive demodulator 77. One of the output leads of demodulator 77 is connected to phase sensitive amplifier 78, FIG. 1(b) by way of lead 79 to armature 56 and lead 80 from contact 60. The other of the output leads of demodulator 77 is connected to amplifier 78 by way of lead 81 to armature 57 and lead 82 from contact 59. Also, coil 84 of relay K3 is connected to amplifier 78 by way of lead 85 and coil 86 of relay K2 is connected to amplifier 78 by way of lead 87.

At start-up with the components angularly displaced rather than oriented, i.e. unsynchronized after switch 16 is moved to the on position, the motor 30 starts to spin the gyroscopic rotor 28 and one or the other of the coils 84, 86 is energized by the output of amplifier 78 depending on the sense of the displacement between the components. When, coil 84 of relay K3 is energized, armature 88 is moved from contact 89 to contact 90 against the bias of spring 91 to close a circuit between the high voltage power lead and winding 52 of torque means 43. This circuit includes lead 92 between lead 17 and contact 90, armature 88, lead 94 and lead 95 to winding 52. Where coil 86 of relay K2 is energized, armature 96 is moved from contact 97 to contact 98 against the bias of spring 99 to close a circuit between the high voltage power lead and winding 51 of torque means 42. Here, the circuit includes lead 100 between lead 92 and contact 98, armature 96, and leads 101 and 102 to winding 51. Until the operating relays K2 or K3 go to null as the system operates in the start-up period with means 43 quickly orienting the components, the relay K1 circuit is open at contact 64, armature 65 or contact 68, armature 67. During this period of operation of the system, armature 65 engages contact 104 or armature 67 engages contact 105.

In the improved system, changeover from start-up to normal operating condition is dependent on the operation of the motor 30 spinning the gyroscopic rotor 28 as well as the closure of the parallel relay K1 circuit which requires orientation between components 10 and 22 and engagement between armature 67, contact 68 and armature 65, contact 64. As the speed of the gyroscopic rotor 28 increases from standstill, the current drawn from the source 14 by the motor line decreases from a maximum value at standstill when the impedance in the motor line is at a minimum value to a minimum current value at the synchronous speed of the motor 30 when the motor line impedance is at its maximum value. The speed of the motor 30 at which the K1 relay coil 54 is energized to move the armatures 55, 56 and 57 against the bias of spring 58, is determined by the threshold amplifier 54' which is responsive to the current drawn by the motor 30. This relay energization is selected to occur at a determined speed below the synchronous speed of the motor. At this changeover speed, armatures 56 and 57 move to engage contacts 72 and 74 respectively and open the circuit to the relays K3 and K2 thereby rendering the high energy level slaving means ineffective. The start-up operation is accordingly accomplished without the inclusion in the system of a time delay device.

At the changeover point in the operation of the system, torque motor 43 is energized at a normal energy level from the synchro winding 49 and demodulator 77. Here, the circuit to the winding 52 of means 43 includes lead 79, armature 56, contact 72, a lead 106 to contact 89, armature 88, lead 94 and lead 95 to the winding. The circuit to the other winding 51 of the means 43 includes lead 81, armature 57, contact 74, a lead 107 to contact 108, an armature 109 of relay K3 engaging the contact 108, lead 101, and lead 102 to the winding. Lead 106 is also connected to torque motor lead 95 in the described circuitry by way of lead 110 to lead 106, contact 111, and armature 112 of relay K2 engaging the contact 111 and lead 94 to the lead 95. Likewise, lead 107 is connected to torque motor lead 102 by way of lead 114 to lead 107, contact 97, armature 96, and lead 101 to lead 102. The described changeover means operates at a determined speed below the normal operating speed of the gyroscopic rotor when the output of the data transmission means is null to render the higher level energizing means for the torquer 43 ineffective and the normal level energizing means for the torquer 43 effective. In the improved system, the normal energy level torquing means is an open circuit under start-up conditions with armature 56 engaging contact 60 rather than contact 72 and with armature 57 engaging contact 59 rather than contact 74. Energization of the conditioning relay K1 reverses the relation between the armatures and contacts so that the higher energy level torquing means is an open circuit under normal operating conditions of the system. In the improved system, the second and third relays K2 and K3 are included in the data transmission circuit with respective armatures in the high energy level and normal energy level input circuits to the torque means 43. Also, armatures 67 and 65 of the relays K3 and K2 are biased by the springs 91, 99 against contacts 68 and 64 to close the K1 relay circuit. In the described system, the means included to render the higher energy level slaving means ineffective at changeover operates simultaneously to render the normal energy level slaving means effective.

Where the craft on which the system is used is an aircraft that includes an autopilot, system malfunction may be indicated by a circuit interlock that includes armatures 115 and 116 of the relays K3 and K2. Here, with the system operating in a normal condition, armature 115 engages contact 117 and armature 116 engages contact 118 to close a circuit that includes an interlock (not shown), lead 119 to contact 118, lead 120 between the armatures 115 and 116, and lead 121 to contact 117. Continuous operation of either relay K3, K2 that would move either armature 115, 116 out of engagement with either contact 117, 118 would open the interlock circuit as a result of malfunction in the operation of relay K1 or the data transmission means.

The chassis component 15 includes a null indicator 122 that is connected across leads 79 and 81. At start-up the pointer of indicator 122 moves from a position displaced from null to a null position as the components become oriented. The system is conditioned for normal operation as relay K1 moves its armatures 56, 57 to engage contacts 72, 74 with the pointer of indicator 122 at null. In normal operation, the gyro 22 is slaved to reference 10 to maintain the components in oriented relation with little variation of the pointer of indicator 122 from null. The armatures 88, 67, 115 and 109 of relay K3 are ganged and are located in the full line position shown in FIG. 1(b) when the system is operating in normal condition under the bias of spring 91. The armatures 112, 65, 116 and 96 of the relay K2 are also ganged and are located in the full line position shown in FIG. 1(b) when the system is operating in normal condition under the bias of spring 99.

Further monitoring is provided for the improved system in a circuit that includes armature 55 of the conditioning relay K1 and a relay monitor K4, FIG. 1(b), with a coil 124, a shunting capacitor 125 and an armature 126 connected to a flag or indicator 127. The monitoring circuit is connected across leads 17 and 19, with lead 128 between lead 36 and armature 55, lead 129 between contact 61 and one end of the coil 124 and capacitor 125 and lead 130 between the other end of the coil 124 and capacitor 125 and ground lead 130. In normal operation of the system, the coil 54 of relay K1 is energized at a level overcoming the bias of spring 58 with armature 55 engaging the contact 71. With the monitoring circuit open, coil 124 is unenergized and spring 131 biases the armature 126 so that the flag 127 is located in an out of view relation to a window 132 in the dotted line position shown in FIG. 1(b). When the speed of the motor 30 drops below the changeover speed for any reason, relay K1 is restored to the influence of spring 58 to close the monitoring circuit. This energizes the coil 124 of relay K4 to move the armature 126 against spring 131 so that the flag 127 appears on the window 132 to an observer. Also, the fast synchronization mode is likewise reestablished to quickly realign the system under such low rotor speed condition.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a compass system of the type in which a directional gyroscope is slaved to a magnetic reference device and in which torquing means are provided at said gyroscope for controlling the azimuthal position thereof, apparatus for quickly synchronizing said gyroscope and reference device comprising,
   (a) means responsive to the speed of the rotor of said gyroscope for providing a signal in accordance therewith,
   (b) data transmission means coupled between said gyroscope and said magnetic reference means for providing a slaving error signal,
   (c) means responsive to said slaving error signal for controlling said torquing means at a greater than normal energy level whereby rapidly to synchronize said gyroscope and reference means, and
   (d) means responsive to said rotor speed signal for controlling said torquing means in accordance with said error signal at a normal low energy level.

2. The apparatus as set forth in claim 1 wherein said error signal responsive means comprises phase sensitive relay means for controlling the sense of said greater than normal energy supplied to said torquer means.

3. The apparatus as set forth in claim 2 wherein said error signal responsive means includes interlock means for rendering said rotor speed signal responsive means ineffective until said slaving error is reduced to a predetermined low value.

4. The apparatus as set forth in claim 1 further including indicator means responsive to said rotor speed signal responsive means for indicating completion of synchronization and for indicating any loss of rotor speed thereafter.

5. A gyroscopic reference system of the type in which the gyroscope is slaved to a directional reference and in which the rotor of said gyroscope provides a signal which varies in accordance with the speed thereof, said system comprising,
   (a) means responsive to the position difference between said gyroscope and said directional reference for producing a slaving error signal,
   (b) torquing means coupled with said gyro and responsive to said slaving error signal for slaving said gyro to said directional reference at a normal slaving rate, and
   (c) means responsive to said slaving error signal and to said rotor speed signal for controlling said torquing means in a manner to substantially increase said slaving rate whereby quickly to synchronize said gyroscope and directional reference.

6. The apparatus set forth in claim 5 wherein said means responsive to said slaving error signal and said rotor speed signal are separate signal responsive means and further include means for controlling one in dependence upon the operation of the other.

References Cited
UNITED STATES PATENTS

| | | | |
|---|---|---|---|
| 2,473,516 | 6/1949 | Fragola | 33—222 |
| 2,561,367 | 7/1951 | Haskins | 74—5.4 |
| 2,588,607 | 3/1952 | Barkalow | 74—5.47 |
| 2,667,705 | 2/1954 | Glenny | 33—222 |

FRED C. MATTERN, JR., *Primary Examiner.*
BROUGHTON G. DURHAM, *Examiner.*
J. D. PUFFER, *Assistant Examiner.*